United States Patent
Ratti et al.

(10) Patent No.: US 10,109,224 B1
(45) Date of Patent: Oct. 23, 2018

(54) METHODS AND DEVICES FOR USING AERIAL VEHICLES TO CREATE GRAPHIC DISPLAYS AND RECONFIGURABLE 3D STRUCTURES

(71) Applicants: Jayant Ratti, Atlanta, GA (US); Steven Chan, Atlanta, GA (US)

(72) Inventors: Jayant Ratti, Atlanta, GA (US); Steven Chan, Atlanta, GA (US)

(73) Assignee: Jayant Ratti, Atlanta, GA (US)

( * ) Notice: Subject to any disclaimer, the term of this patent is extended or adjusted under 35 U.S.C. 154(b) by 59 days.

(21) Appl. No.: 15/264,455

(22) Filed: Sep. 13, 2016

Related U.S. Application Data

(63) Continuation-in-part of application No. 15/193,101, filed on Jun. 26, 2016, now abandoned.

(60) Provisional application No. 62/185,235, filed on Jun. 26, 2015.

(51) Int. Cl.
*G09G 3/00* (2006.01)
*B64C 39/02* (2006.01)
*B64B 1/40* (2006.01)

(52) U.S. Cl.
CPC .............. *G09G 3/005* (2013.01); *B64B 1/40* (2013.01); *B64C 39/024* (2013.01); *G09G 2360/144* (2013.01); *G09G 2380/12* (2013.01)

(58) Field of Classification Search
CPC .......... G09G 3/005; G09G 3/003; B64B 1/40; B64C 39/024
USPC .......................................................... 345/31
See application file for complete search history.

(56) References Cited

U.S. PATENT DOCUMENTS

| | | | | |
|---|---|---|---|---|
| 3,867,633 A | * | 2/1975 | Patrick | G02B 27/01 250/334 |
| 5,717,416 A | * | 2/1998 | Chakrabarti | G09G 3/003 345/31 |
| 9,576,349 B2 | * | 2/2017 | Omer | G06T 5/008 |
| 2005/0052404 A1 | * | 3/2005 | Kim | G09G 3/003 345/108 |
| 2006/0038831 A1 | * | 2/2006 | Gilbert | B60K 35/00 345/619 |
| 2006/0075356 A1 | * | 4/2006 | Faulkner | G06T 17/05 715/782 |
| 2007/0103545 A1 | * | 5/2007 | Listig | G09F 9/33 348/41 |
| 2010/0097448 A1 | * | 4/2010 | Gilbert | B60K 35/00 348/51 |
| 2010/0171681 A1 | * | 7/2010 | Cabanas | G09G 3/005 345/31 |

(Continued)

*Primary Examiner* — Fred Tzeng

(57) ABSTRACT

Assemblies for creating graphic displays and art are disclosed. The assemblies include at least one vehicle that is capable of flight; a series of light emitting elements independently affixed to the vehicle or mounted to one or more radially extending elements; an axis around which the radially extending elements are configured to rotate; and at least one motor that is configured to cause the axis and the radially extending elements to rotate. Rotation of the radially extending elements generates a graphic display produced by the light emitting elements (through a "persistence of vision" optical illusion). Methods of using such assemblies are also disclosed, such as methods for producing a graphic display (including aggregated graphic displays), methods for creating three-dimensional structures, and methods for camouflaging aerial vehicles and other objects.

18 Claims, 17 Drawing Sheets

(56) References Cited

U.S. PATENT DOCUMENTS

2012/0200401 A1* 8/2012 Goldwater ................ B62J 6/20
340/432
2015/0147097 A1* 5/2015 Shimada ............ G03G 15/0889
399/263

* cited by examiner

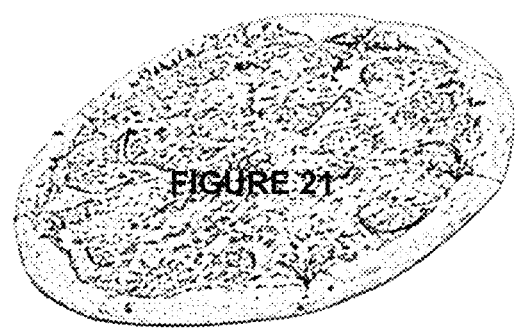
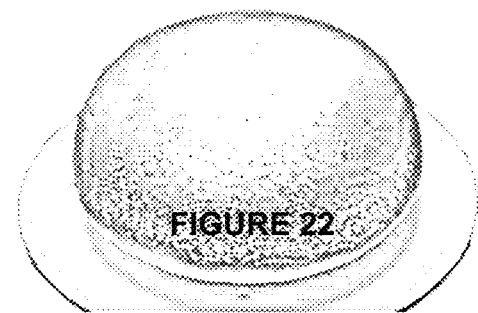

METHODS AND DEVICES FOR USING AERIAL VEHICLES TO CREATE GRAPHIC DISPLAYS AND RECONFIGURABLE 3D STRUCTURES

CROSS-REFERENCE TO RELATED APPLICATIONS

This application is a continuation-in-part of application Ser. No. 15/193,101, filed Jun. 26, 2016, which claims priority to provisional patent application Ser. No. 62/185,235, filed on Jun. 26, 2015.

FIELD OF THE INVENTION

The field of the invention relates to methods of visual communication, persistence of vision applications and aerial vehicles, namely, the use of persistence of vision on aerial vehicles to create graphic displays, graphic displays that are configured to fly or be suspended in the air, and aerial vehicles positioning for creating artificial and temporary structures.

BACKGROUND OF THE INVENTION

The phrase "persistence of vision" (POV) refers to an optical illusion that is generated when multiple discrete images (or displays) blend into a single image in the human mind. POV has been used for many years. For example, POV underlies the perception of motion in cinema and animated films. It is known in the art that a two-dimensional POV display may be produced by rapidly moving a single row of light emitting elements, such as light emitting diodes (LEDs), along a linear or circular path. Similarly, a three-dimensional POV display may be produced using a two-dimensional grid of LEDs that is rotated through a defined volume.

As described further below, the assemblies and methods of the present invention utilize POV in combination with aerial vehicles to produce graphic displays, convey messages, and provide a unique method of advertising and communicating to a group of observers. In addition, as described further below, the assemblies and methods of the present invention may be used to produce custom three-dimensional structures, which may also utilize POV to produce graphic displays and for other applications described herein.

SUMMARY OF THE INVENTION

According to certain aspects of the present invention, assemblies for creating an aerial graphic display are provided. The assemblies include at least one vehicle that is capable of flight, such as a drone, blimp, motorized balloon, and other vehicles of similar size that are capable of flight. The assemblies further include a series of light emitting elements, such as light emitting diodes (LEDs), mounted independently such that each air vehicle can emit combinations of light. The assemblies may also include a series of light emitting elements, such as light emitting diodes (LEDs), mounted to one or more radially extending elements The assemblies include an axis around which the radially extending elements are configured to rotate, with the axis being directly or indirectly connected to the vehicle. In addition, the assemblies include at least one motor that is configured to cause the axis and the connected radially extending elements to rotate. The invention provides that rotation of the radially extending elements produces a graphic display that is generated by the light emitting elements (with the rotating light emitting elements generating a "persistence of vision" optical illusion that represents the graphical display).

According to certain preferred aspects of the present invention, the assemblies include two or more vehicles that are capable of flight—and, depending on how the assemblies are being used, a multitude of vehicles that are each capable of flight. In such embodiments, each of such aerial vehicles include the series of light emitting elements that are independent or affixed to radially extending elements, which are operably connected to an axis and motor as described herein, and collectively may be activated and used to create an aggregated graphic display. More particularly, each aerial vehicle (and its associated light emitting elements) will produce its own graphical display, with each individual display representing a portion of and contributing to an aggregated graphic display produced by all of the vehicles used in the assembly (as described further below).

According to certain aspects of the invention, the radially extending elements of each vehicle are configured to be retractable and extendable, whereby rotation of the axis and the radially extending elements produces a centrifugal force that causes the radially extending elements to elongate. In such embodiments, the invention provides that the vehicle will preferably include a spring that is configured to pull the radially extending elements into a central hub when the axis and the radially extending elements are not rotating (e.g., when the vehicle is not being used and operated). Still further, the invention provides that the radially extending elements may, optionally, include a weighting element positioned at or near a distal end of each radially extending element, which enhances the inertia of the sub-assembly and creates a larger centrifugal force that is generated when the radially extending elements are rotating. The invention further provides that the vehicles will include a power source, which may include an internal source (such as a battery) or chemical engine, an atmospheric energy extraction device (such as a solar panel), a power line connected to an external power source (such as a powered tether line), or combinations of the foregoing.

According to yet further preferred aspects of the present invention, methods of using the assemblies described herein are provided. More specifically, the invention encompasses methods for creating a graphic display that utilize the assemblies described herein. In such embodiments, the methods generally include activating the assemblies described herein, including the aerial vehicle(s), motor, radially extending elements, and light emitting elements, to produce a graphic display using a persistence of vision optical illusion. In certain preferred embodiments, such methods involve the use of multiple vehicles that are capable of flight and positioning each of such vehicles in a desired location to form an organized three-dimensional structure, with each of such vehicles generating a graphic display that represents a component of an aggregated graphic display created by the multiple vehicles. The invention provides that the aggregated graphic display may represent an image, an informational message, an advertisement, or a camouflaged rendering (as described further below).

Furthermore, the invention encompasses methods for creating a three-dimensional structure using the assemblies described herein. In such embodiments, the methods generally include activating multiple vehicles that are each capable of flight (as described herein) and positioning each of such vehicles in a desired location to form an organized three-dimensional structure, such as a wall, ceiling, or other three-dimensional object. In such embodiments, the three-dimensional structure may exhibit a graphic display on a surface thereof, e.g., an image, an informational message, an advertisement, or a camouflaged rendering.

Furthermore, the invention encompasses methods for creating an active camouflage whereby a three-dimensional structure (or individual aerial vehicles or their static representations) can hide an object or area of interest. Additionally, each aerial vehicle can also be hidden using the persistence of vision techniques discussed herein, in relation to the aerial vehicle as discussed herein. The invention provides that use of flying motorized balloons or blimps, working standalone or added in concert with an aerial vehicle or motorized drone, can help reduce the noise signature of the system.

The above-mentioned and additional features of the present invention are further illustrated in the Detailed Description contained herein.

BRIEF DESCRIPTION OF THE FIGURES

FIG. 21: An example custom shape and graphic display (a pizza) created by the aerial vehicles described herein.

FIG. 22: Another example custom shape and graphic display (a cake) created by the aerial vehicles described herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 13:
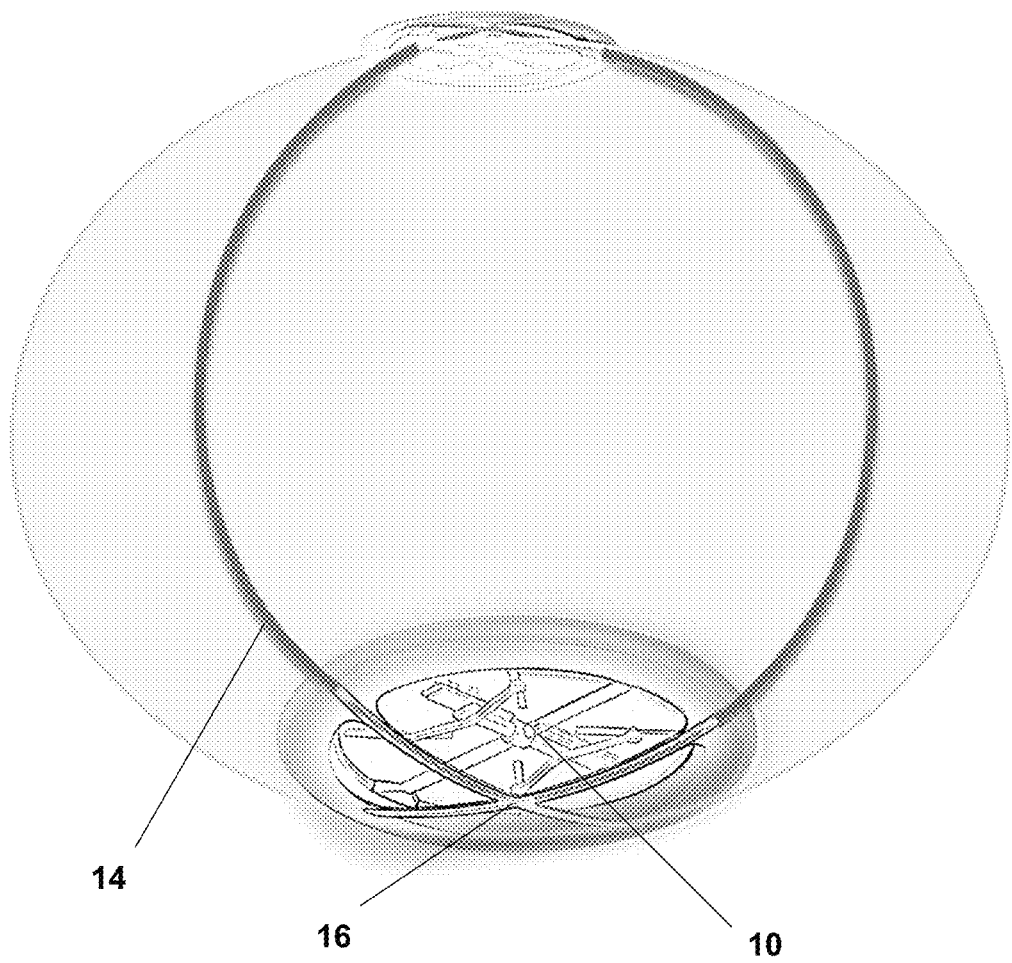
FIG. 13: An illustration showing a drone that is positioned at the base of, and is configured to propel, a balloon or blimp.
Figure 14:
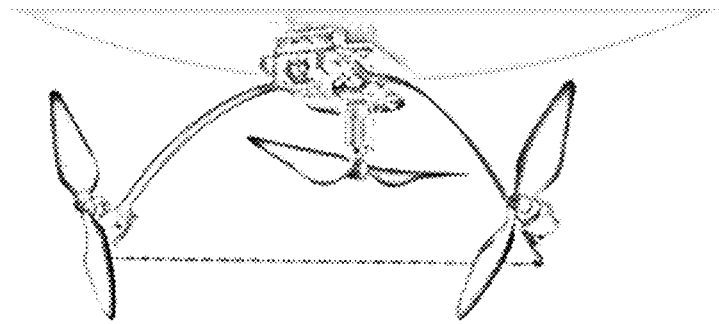
FIG. 14: An example set of propellers to provide a propulsion force, which may be used with the devices described herein (particularly when the aerial vehicle of the assembly is a blimp or balloon).
Figure 15:
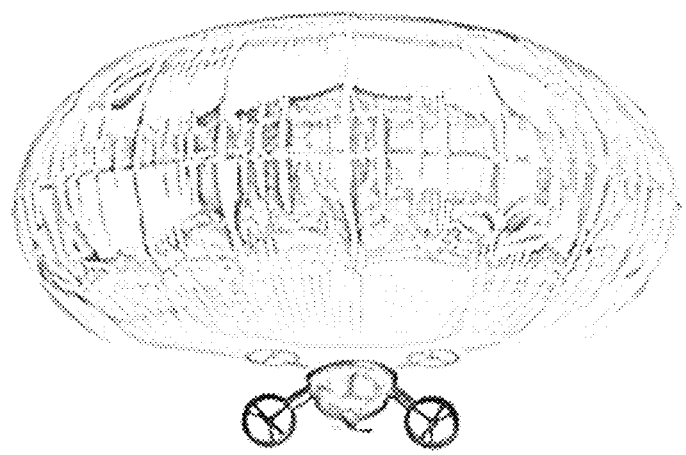
FIG. 15: Another example set of propellers to provide a propulsion force, which may be used with the devices described herein (particularly when the aerial vehicle of the assembly is a blimp or balloon).
Figure 16:
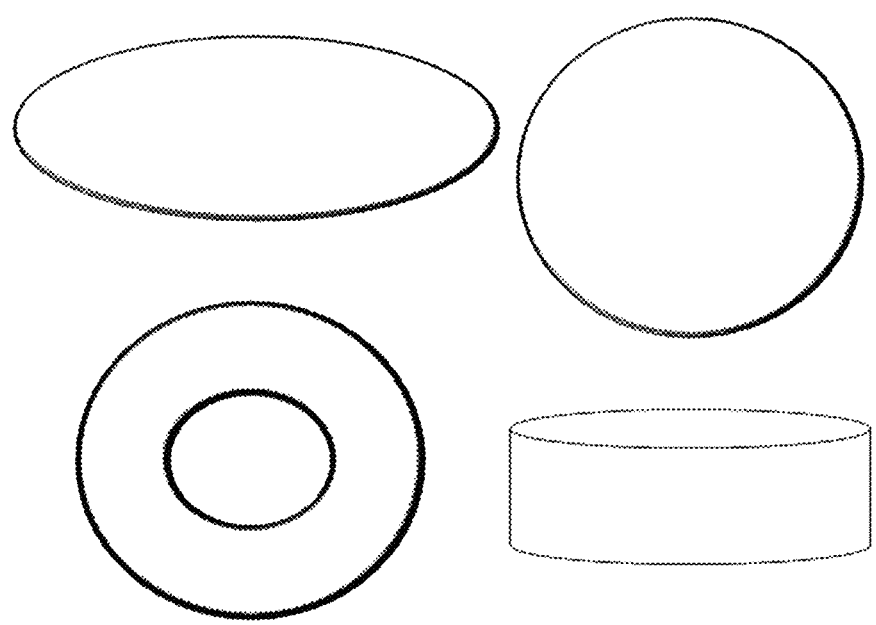
FIG. 16: A rendering of the different shapes that may be created with the POV surface. A blimp or balloon may exhibit similar shapes.
Figure 17:
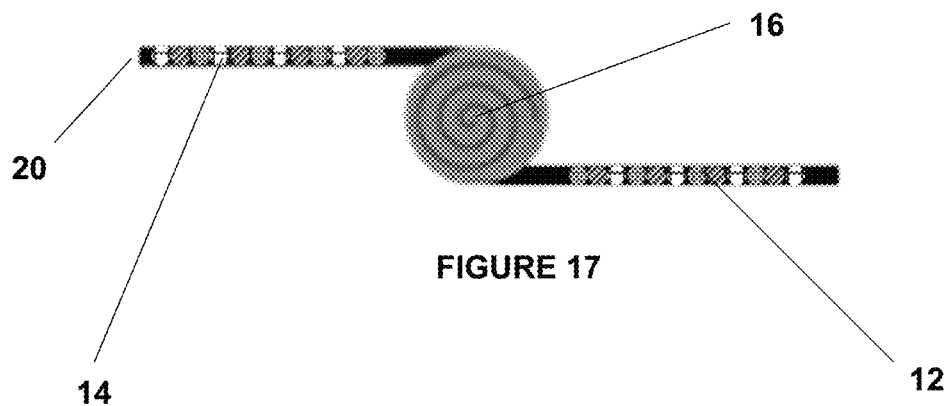
FIG. 17: An example of an aerial vehicle having 2-strips (two radially extending elements) and associated LEDs that extend from the hub during spin. LEDs that emit different colors may be used, e.g., Red (R), Green (G), and Blue (B) LEDs may be used (which, collectively, provide the ability to produce any color when used together). Furthermore, each LED can also be an RGB LED.
Figure 18:
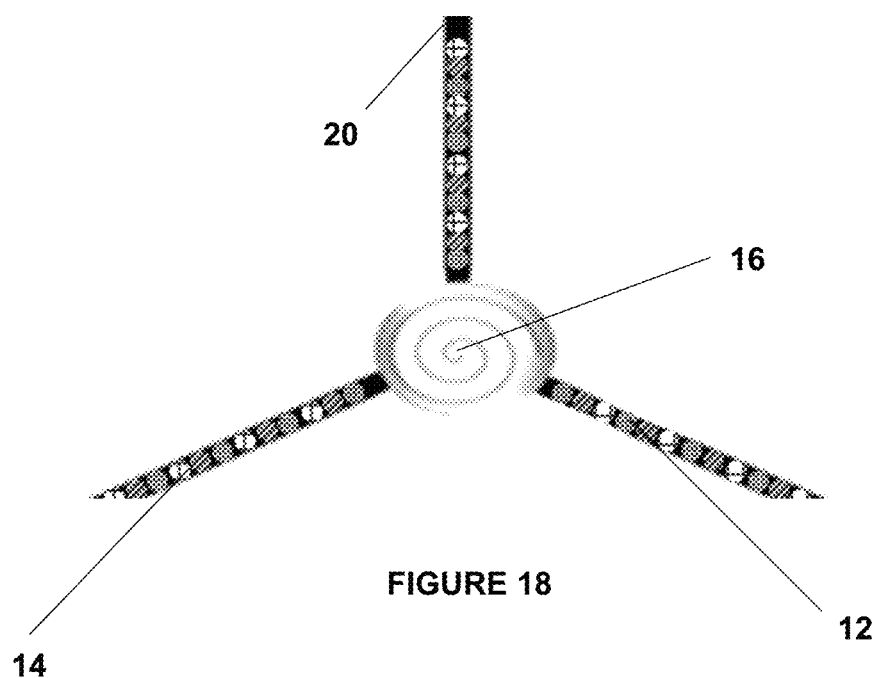
FIG. 18: An example of an aerial vehicle having 3-strips (three radially extending elements) and associated LEDs that extend from the hub during spin. LEDs that emit different colors may be used, e.g., Red (R), Green (G), and Blue (B) LEDs may be used (which, collectively, provide the ability to produce any color when used together).
Figure 19:
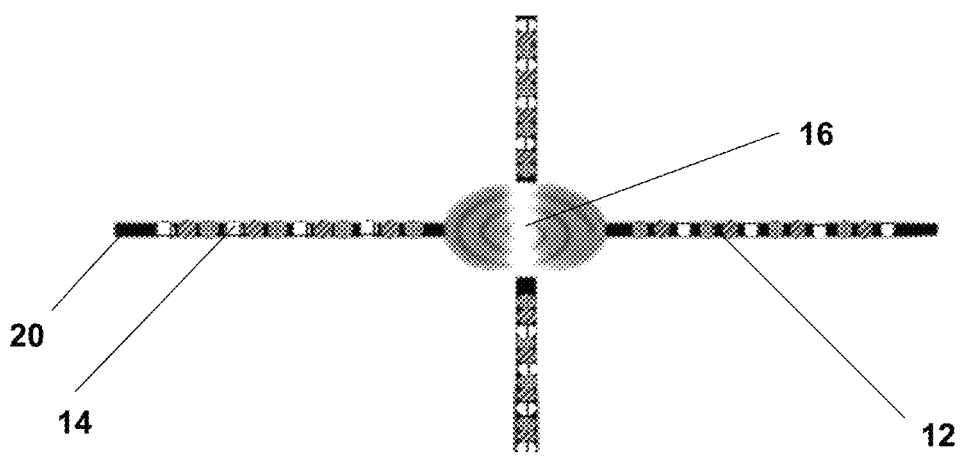
FIG. 19: An example of an aerial vehicle having 4-strips (four radially extending elements) and associated LEDs that extend from the hub during spin. LEDs that emit different colors may be used, e.g., Red (R), Green (G), and Blue (B) LEDs may be used (which, collectively, provide the ability to produce any color when used together).

Referring now to FIGS. 1-37, according to certain preferred embodiments of the present invention, assemblies for creating a graphic display are provided. The assemblies include at least one vehicle that is capable of flight, such as a drone, blimp, balloon, and other vehicles of similar size that are capable of flight. FIGS. 4-15 provide non-limiting examples of rotary drones 10 that may be used as the vehicle (that is capable of flight) of the assemblies described herein. The drones 10 may exhibit various designs, including drones 10 that comprise one main propeller, or that comprise two, three, four, or more propellers. The invention provides that the drones 10 used in the assemblies of the present invention are not limited to any particular configuration, nor the number of propellers used, so long as the drones 10 are capable of flight. The assemblies further include a series of light emitting elements 12 (FIGS. 17-19), such as light emitting diodes (LEDs), which are mounted to one or more radially extending elements 14 (with the radially extending elements 14 being positioned on a side or bottom area of the aerial vehicle). FIGS. 7-13 illustrate a rotary drone 10, which exhibits radially extending elements 14 of different configurations (to which the light emitting elements 12 may be affixed). The invention provides that different configurations of radially extending elements 14, such as those shown in FIGS. 7-12, allow different graphic displays to be created, as described herein (e.g., graphic displays exhibiting different light intensities, resolutions, color allocations, and other properties). As shown in FIG. 13, such concepts may be extended and applied to blimps or balloons, whereby the radially extending elements extend around the balloon/blimp and are configured to rotate (much the same way as they would in FIGS. 7-12). The invention provides that having the LEDs rotate and form a volume allows for the resulting display to exhibit a 3D shape, which in turn allows for viewing from all directions around the device. Such embodiments of the invention can be used to produce position- or perspective-independent displays.

Figure 1:
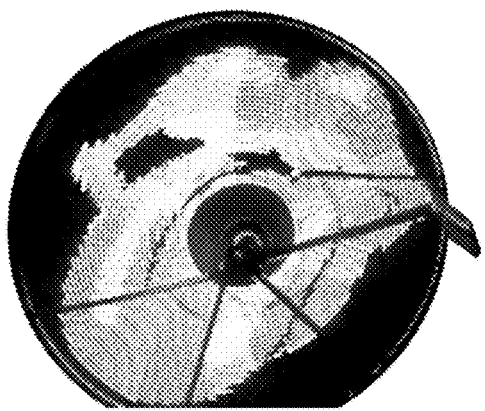
FIG. 1: An example image being displayed by POV methods on a bicycle wheel.
Figure 2:
FIG. 2: Another example image being displayed by POV methods on a bicycle wheel.
Figure 3:
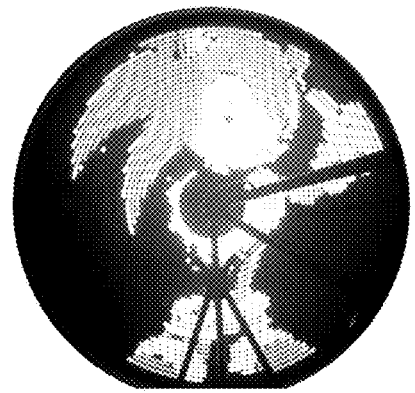
FIG. 3: Another example image being displayed by POV methods on a bicycle wheel.
Figure 4:
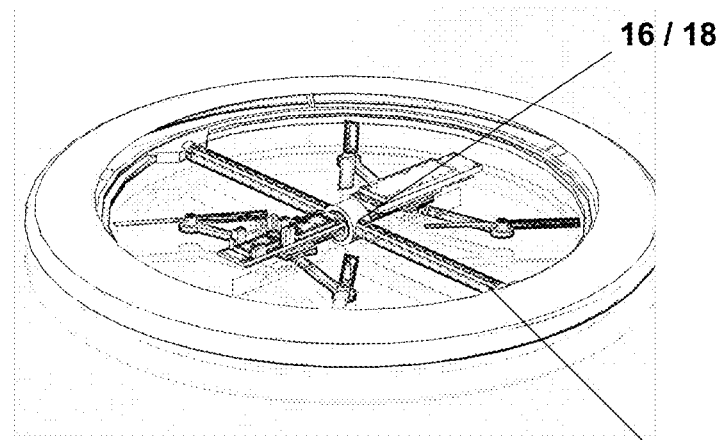
FIG. 4: An example implementation of LEDs on a rotary drone that exhibits a gimbaled structure.
Figure 5:
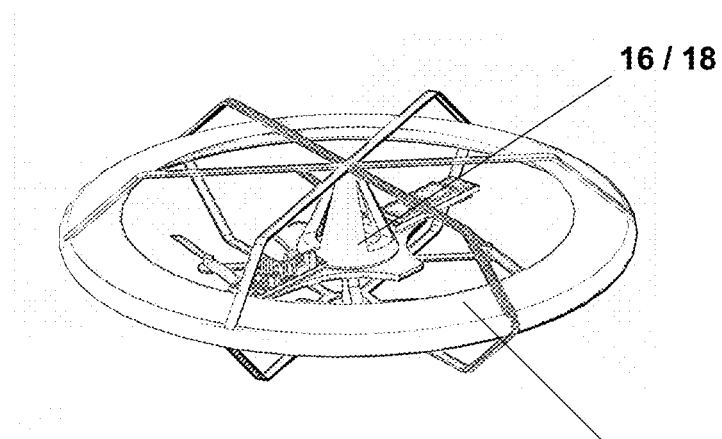
FIG. 5: An example implementation of LEDs on a rotary drone that exhibits a spinning disc configuration.
Figure 6:
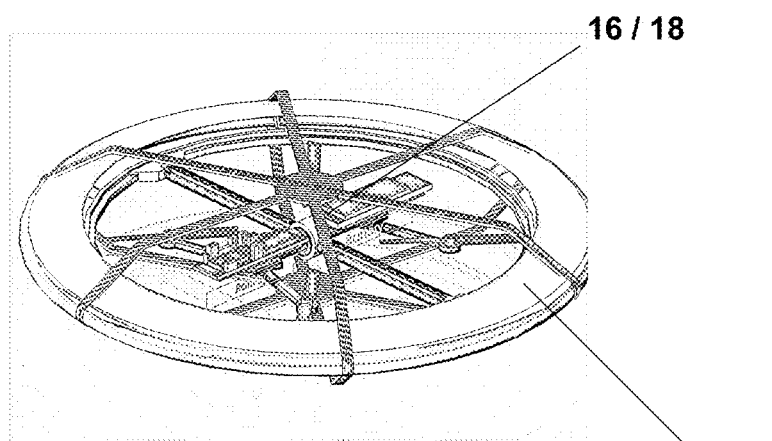
FIG. 6: An example implementation of LEDs on a rotary drone that exhibits a spinning shell configuration.
Figure 7:
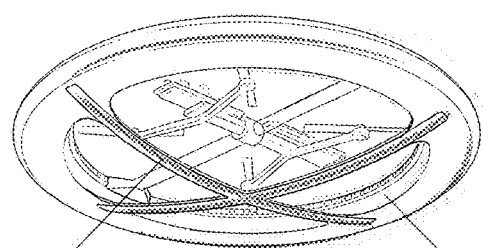
FIG. 7: An example design of a rotary drone that is configured to use POV to display a graphic image or design, which exhibits an aerodynamic frame and includes a gimbaled architecture to host a set of LEDs.
Figure 8:
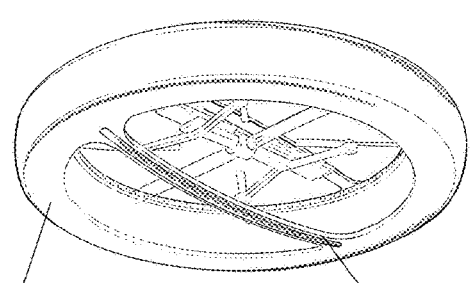
FIG. 8: Another example design of a rotary drone that is configured to use POV to display a graphic image or design, which exhibits an aerodynamic frame and includes a gimbaled architecture to host a set of LEDs.
Figure 9:
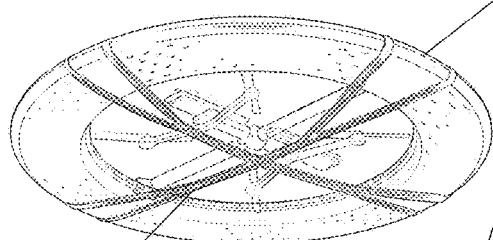
FIG. 9: Another example design of a rotary drone that is configured to use POV to display a graphic image or design, which exhibits an aerodynamic frame and includes a gimbaled architecture to host a set of LEDs.
Figure 10:
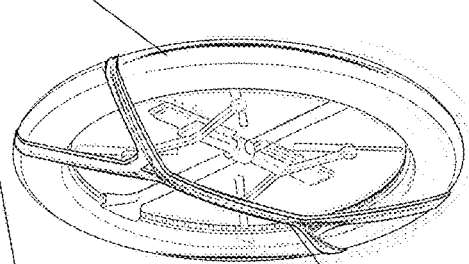
FIG. 10: Another example design of a rotary drone that is configured to use POV to display a graphic image or design, which exhibits an aerodynamic frame and includes a gimbaled architecture to host a set of LEDs.
Figure 11:
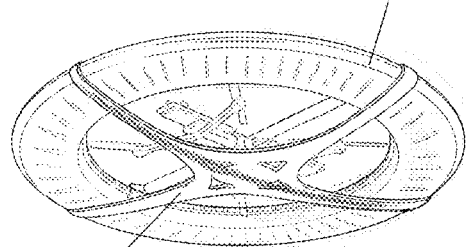
FIG. 11: Another example design of a rotary drone that is configured to use POV to display a graphic image or design, which exhibits an aerodynamic frame and includes a gimbaled architecture to host a set of LEDs.
Figure 12:
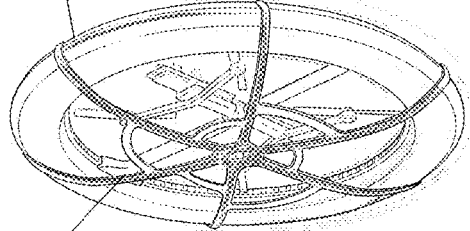
FIG. 12: Another example design of a rotary drone that is configured to use POV to display a graphic image or design, which exhibits an aerodynamic frame and includes a gimbaled architecture to host a set of LEDs.

The invention provides that the assemblies further include an axis 16 around which the radially extending elements 14 are configured to rotate, with the axis 16 being directly or indirectly connected to the aerial vehicle. In addition, the assemblies include a motor 18 that is configured to cause the axis 16 and the radially extending elements 14 to rotate. The invention provides that rotation of the radially extending elements 14 produces a graphic display that is generated by the light emitting elements 12, with such display being created by a "persistence of vision" optical illusion. The type of "persistence of vision" optical illusion that is generated using the assemblies is similar to the "persistence of vision" optical illusions that children have been creating (for many years) with different types of reflectors (or other light emitting elements) affixed to the spokes of a rotating bicycle wheel (or active LEDs causing intermittent switching and color changes of LEDs to produce patterns, motion graphics, or even movies and animations, examples of which are shown in FIGS. 1-3). In the assemblies of the present invention, the light emitting elements 12 may consist of RGB light emitting diodes (LEDs) that, depending on their current position around the orbit of rotation about the axis 16, are configured and programmed to change color (and/or light intensity) to reflect the desired "pixels" that should be present at each particular location, which thereby creates an image or the illusion of movement (similar to the display apparatus that utilizes POV that is featured in U.S. Pat. No. 5,748,157, which is hereby incorporated by reference).

Figure 20:
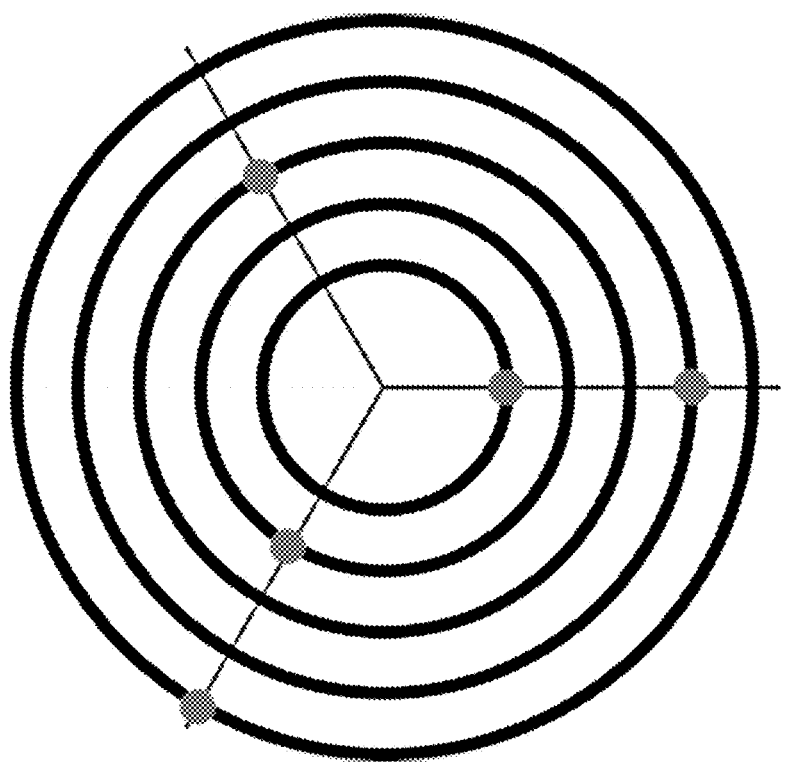
FIG. 20: A demonstration of higher-resolution POV graphic display that is achieved when using 3-strips (three radially extending elements). By interleaving the radial location of LEDs as shown, a 3-strip LED display can be formed at a tighter density than a single LED strip display, where size of each LED creates constraints on the density of the LEDs' arrangement.
Figure 23A:
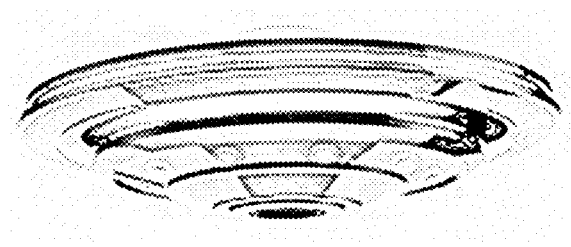
FIG. 23A: Another example custom shape and graphic display (a flying saucer) created by the aerial vehicles described herein.
Figure 23B:
FIG. 23B: Additional example custom shapes and graphic displays that show various common objects made using POV.
Figure 24:
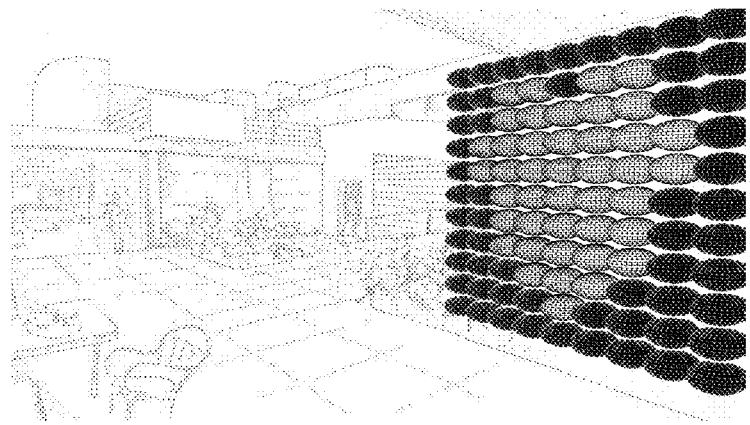
FIG. 24: An example application of the present invention, used to create an image on a wall.
Figure 25:
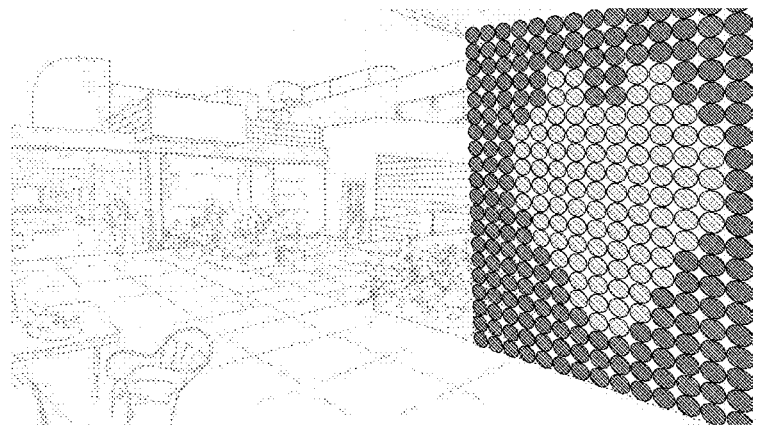
FIG. 25: Another example application of the present invention, used to create an image on a wall.
Figure 26:
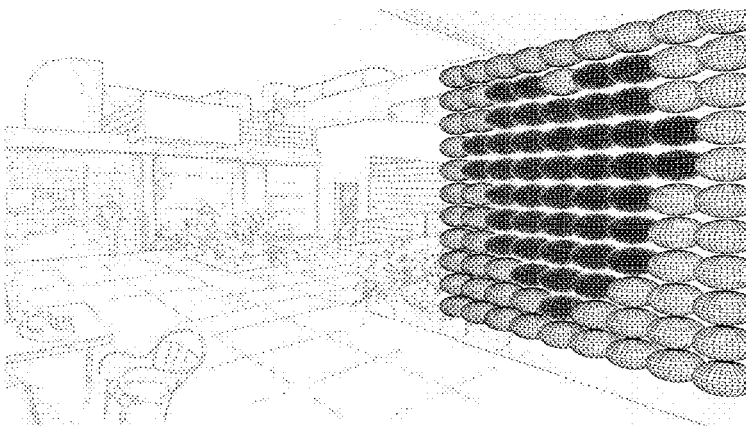
FIG. 26: Another example application of the present invention, used to create an image on a wall.
Figure 27:
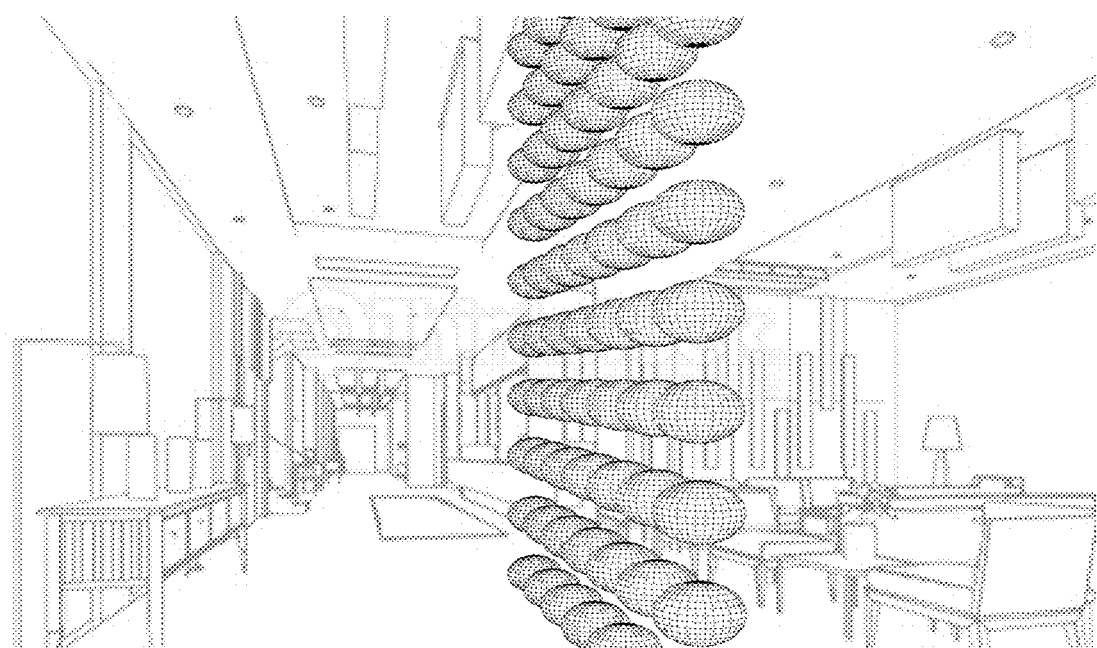
FIG. 27: Another example application of the present invention, used to create a wall inside of a room.
Figure 28:
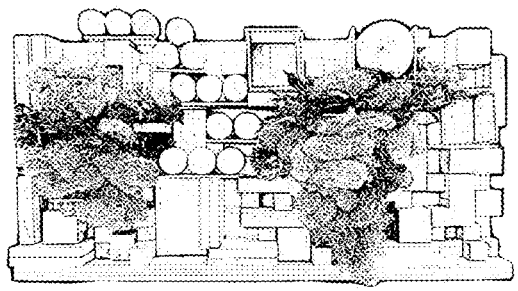
FIG. 28: An example application of the present invention, which is a rendering of a room that includes a plurality of blimps/balloons described herein of various sizes.
Figure 29:
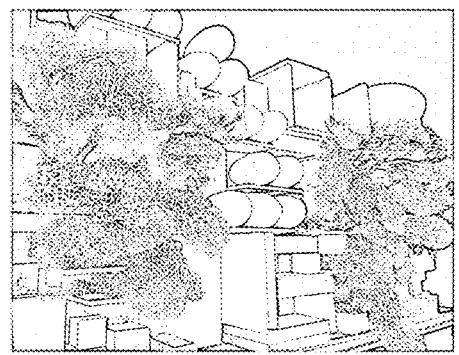
FIG. 29: Another example application of the present invention, which is a rendering of a room that includes a plurality of blimps/balloons described herein of various sizes.
Figure 30:
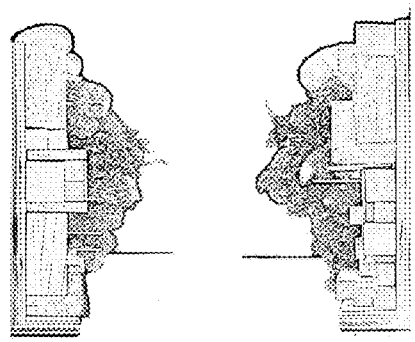
FIG. 30: Another example application of the present invention, which is a rendering of a room that includes a plurality of blimps/balloons described herein of various sizes.
Figure 31:
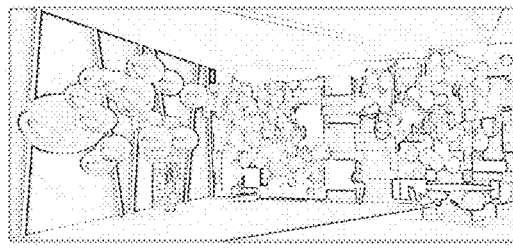
FIG. 31: Another example application of the present invention, which is a rendering of a room that includes a plurality of blimps/balloons described herein of various sizes. The blimps/balloons can be arranged in 3D, such that they appear as different shapes and patterns when viewed from different angles.
Figure 32:
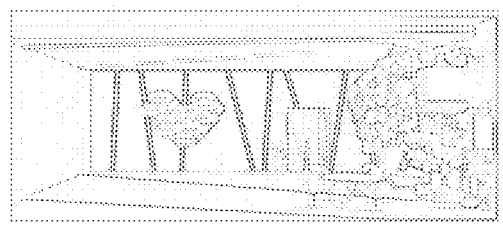
FIG. 32: Another example application of the present invention, which is a different view of the same room from FIG. 31 that includes a plurality of blimps/balloons described herein of various sizes. The blimps shown therein are the same blimps that are shown in FIG. 31, when viewed from a different angle to produce a different visual pattern.
Figure 33:
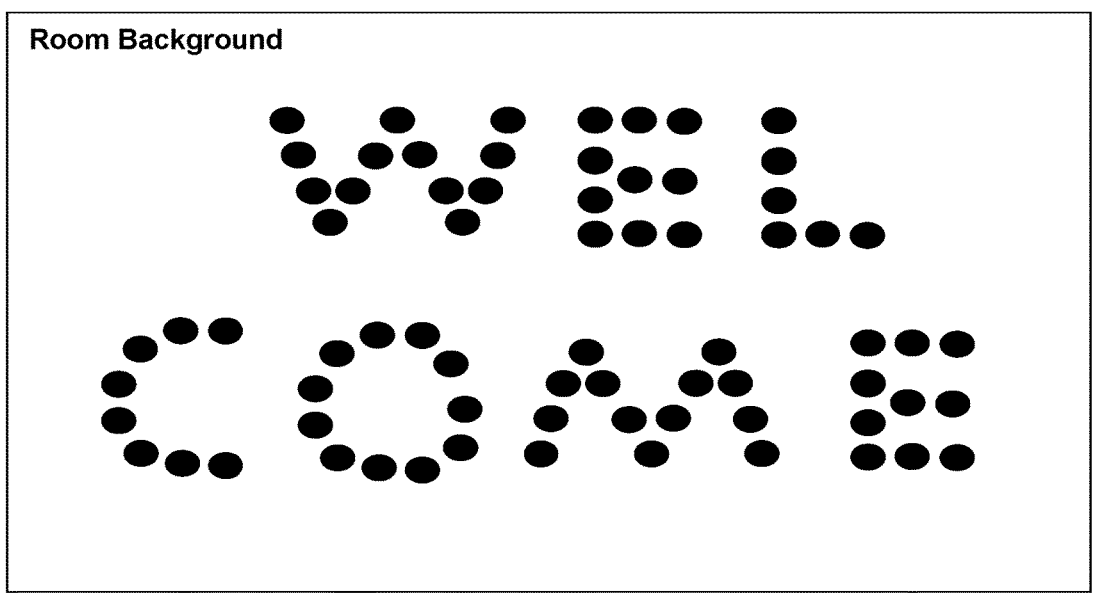
FIG. 33: Another example application of the present invention, used to create a welcoming message and sign within the entry of a room.
Figure 34:
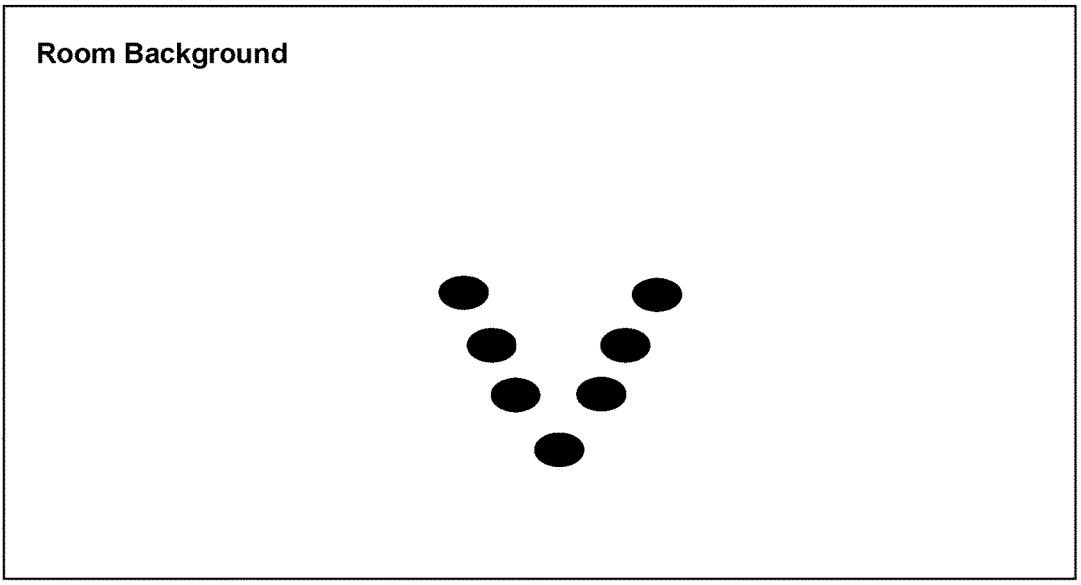
FIG. 34: Another example application of the present invention, used to create a directional sign within a room.
Figure 35:
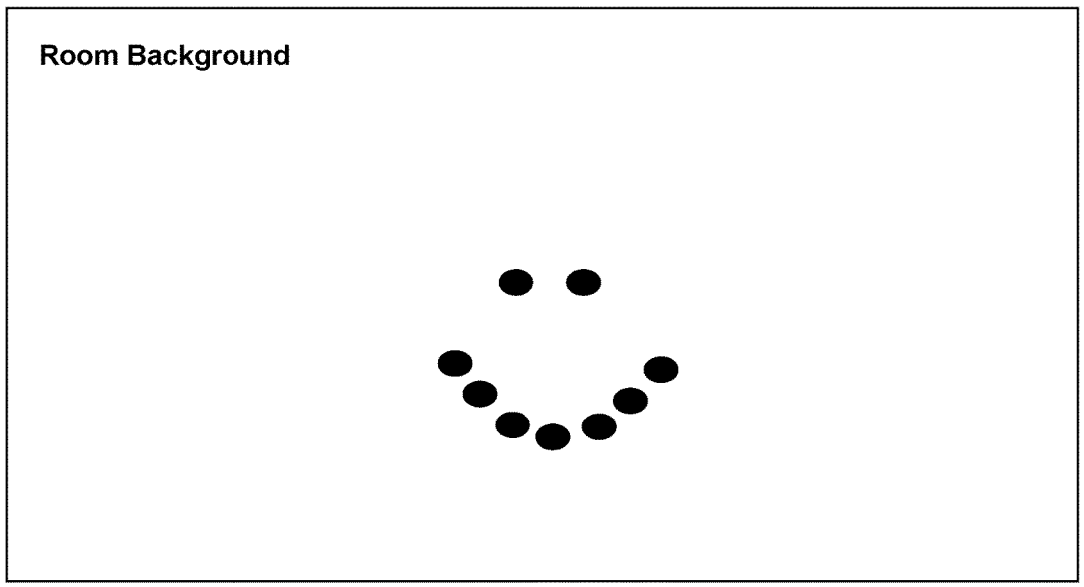
FIG. 35: Another example application of the present invention, used to create a smiling face within a room.
Figure 36:
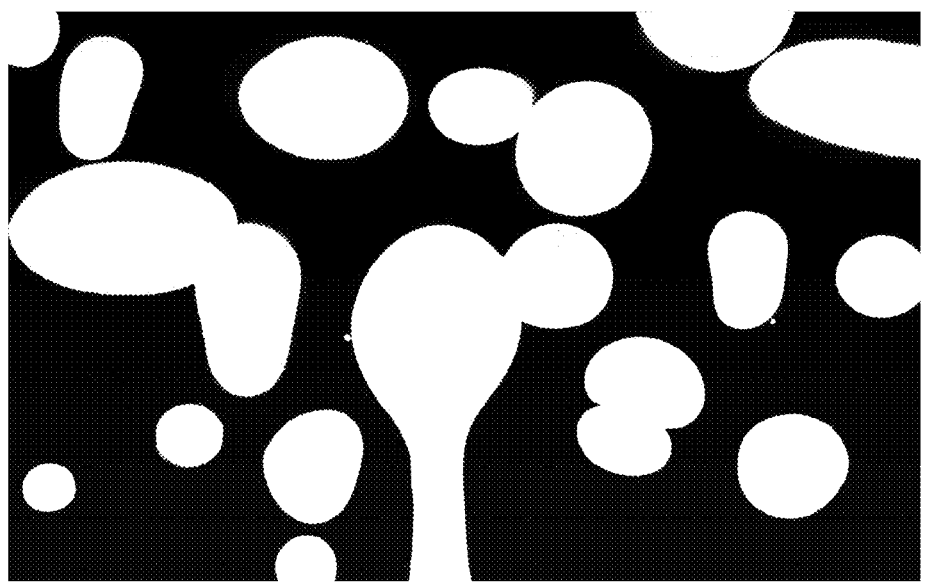
FIG. 36: Another example of the present invention, used to create floating and flying art similar to lava lamps, wherein the blimps travel in various directions and dynamically rise up (when charged) or fall down (due to lack of charge)—analogous to warmer wax and cooler wax in a lava lamp.
Figure 37:
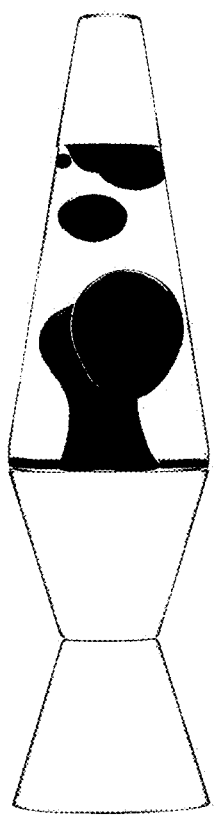
FIG. 37: An example of the lava lamp that inspired the motion of blimps in FIG. 36.

The invention provides that resolution of a graphic display—produced using the assemblies and methods described herein—will be influenced by pixel density, namely, the linear density of light emitting elements 12 along the radially extending elements 14. The invention provides that there will be a tradeoff between the number of light emitting elements 12 (e.g., LEDs) employed and the overall brightness of the graphic display, insofar as smaller LEDs will generate less light than larger counterparts (but will exhibit less weight and place less stress on the aerial vehicle). The invention provides that the number of radially extending elements 14 used in a vehicle may be adjusted (increased) to accommodate such tradeoff—each with slightly lower LED density, but nonetheless providing the same overall density that may be desired to produce the graphic display. See, e.g., FIG. 17 (two radially extending elements 14), FIG. 18 (three radially extending elements 14), and FIG. 19 (four radially extending elements 14). Furthermore, the invention provides that the phase of positioning of the LEDs may be altered to increase resolution of the aerial display, as illustrated in FIG. 20. The invention provides that the intensity of light may be enhanced by keeping the phasing the same across all of the radially extending elements 14, which causes a viewer to experience an additive effect of intensities (making the graphic display appear brighter than the maximum intensity that could otherwise be emitted by a single LED).

The invention provides that the assemblies may further comprise a computer processor (and, preferably, random access memory) that is configured to provide instructions to the light emitting elements 12 (which are operably connected to and in communication with the computer processor). More particularly, in such embodiments, the instructions will inform the light emitting elements 12 when, and for how long, each light emitting element 12 should activate (and, in some embodiments, which color(s) and light intensities should be emitted at any given time). The invention provides that the computer processor will be responsible for instructing the light emitting elements 12 in a manner that allows the light emitting elements 12, when rotating as described herein, to produce the desired graphical image. The invention provides that the computer processor may be located within the aerial vehicle, e.g., a drone 10. In certain alternative embodiments, the computer processor may be located within a controller (which may be operated by a person), and configured to wirelessly communicate with a receiver housed within the aerial vehicle, e.g., a drone 10, via radio frequency signals, Bluetooth® signals, and other suitable forms of wireless communication. The invention provides that the computer processor may be pre-programmed with the necessary instructions to produce a desired graphic display. Still further, in other embodiments, the computer processor may be programmed (either directly or remotely) at any point in time by an operator of the assembly, to alter the instructions provided to the light emitting elements 12 in order to change the resulting graphic display created by the assembly.

According to certain preferred embodiments of the present invention, the assemblies include two or more vehicles (e.g., drones 10) that are capable of flight—and, depending on how the assemblies are being used, a multitude of vehicles (e.g., drones 10) that are capable of flight. In such embodiments, each of such vehicles include a series of light emitting elements 12, radially extending elements 14, an axis 16, and a motor 18 as described herein. In such embodiments, the multitude of vehicles may all be activated, operated, positioned, and used to create an aggregated graphic display (as described further below). More specifically, the plurality of aerial vehicles may be oriented and organized to produce a custom/flying three-dimensional structure, with each vehicle creating its own color (or multiple colors) or POV image that contributes towards the production of an aggregate graphic display that may be viewed by a human observer.

According to certain embodiments of the invention, the radially extending elements 14 of each vehicle may be optionally configured to be retractable and extendable, whereby rotation of the axis 16 and the radially extending elements 14 produces a centrifugal force that causes the radially extending elements 14 to elongate. The invention provides that the vehicle may also preferably include a spring that is configured to pull and retract the radially extending elements 14 into a central hub when the axis 16 and the radially extending elements 14 are not rotating (e.g., when the aerial vehicle is not being operated and used as described herein). Still further, the invention provides that the radially extending elements 14 may, optionally, include a weighting element 20 (FIGS. 17-19) positioned at or near a distal end of each radially extending element 14, which is configured to enhance the centrifugal force that is generated when the radially extending elements 14 are rotating. The invention further provides that the vehicles will include (or will otherwise be operably connected to) a power source, which may include an internal source (such as a battery or chemical engine), an atmospheric source (such as a solar panel), an external source (such as a tethered power line connected to an external power source), an inductive or laser or other wireless means of external power sources, or combinations of the foregoing.

According to further embodiments of the present invention, the aerial vehicles used in the assemblies described herein may further include (or consist of) a blimp or balloon, which may be propelled, in whole or in part, by a drone 10 (FIG. 13), propellers (FIGS. 14 and 15), or other suitable means. As mentioned above and shown in FIG. 13, in such embodiments, the blimps or balloons may comprise radially extending elements 14 that are configured to extend around the balloon/blimp and are configured to rotate (much the same way as they would in FIGS. 7-12).

According to yet further preferred embodiments of the present invention, methods of using the assemblies described herein are provided. More specifically, the invention encompasses methods for creating a graphic display that utilize the assemblies described herein. In such embodiments, the methods generally include activating the assemblies described herein, including the aerial vehicle(s), e.g., drones 10, motor 18, radially extending elements 14, and light emitting elements 12, to produce a graphic display using a persistence of vision (POV) optical illusion. Still further, in certain embodiments, the POV assembly can be replaced with an aerial vehicle that includes one or more non-rotating light sources. In certain preferred embodiments, such methods involve the use of multiple vehicles that are capable of flight and positioning each of such vehicles in a desired location to form an organized and custom three-dimensional structure, with each of such vehicles generating its own graphic display that represents a component of an aggregated graphic display created by the multiple vehicles. The invention provides that the aggregated graphic display may represent an image or picture of an object (e.g., FIGS. 21-26), an informational message or greeting (e.g., FIGS. 33-35), an advertisement, or a camouflaged rendering. In the case of a camouflaged rendering, the aggregated graphic display may be positioned on a bottom side of the aerial vehicles, such that the aggregated graphic display produces an image of a sky and clouds, which may render the aerial vehicles (e.g., drones 10) invisible to an unknowing observer on the ground. In another embodiment, the aggregate graphic display may be positioned around the entire aerial vehicle (e.g., FIG. 13 and FIG. 7-12), such that the LEDs copy the color of their diametrically opposite LEDs, e.g., while flying through a forest, a brick hallway etc. (such uses of the assemblies may have military applications where the ability to fly and maneuver a series of drones 10 in a stealth manner may be desirable or advantageous for combat, espionage, or surveillance purposes).

According to still further preferred embodiments, the invention encompasses methods for creating a three-dimensional structure using the assemblies described herein. In such embodiments, the methods generally include activating multiple vehicles that are each capable of flight (as described herein) and positioning each of such vehicles in a desired location to form an organized and custom three-dimensional structure, such as an interior wall (e.g., FIG. 27) or other three-dimensional objects (FIGS. 28-32). In such embodiments, the resulting walls and ceiling may be dynamically altered (moved and reconfigured) and, furthermore, may exhibit advertising and/or other graphic displays.

Indeed, the invention provides that the assemblies and methods described herein may be used and implemented in a variety of ways. For example, in an outside area, far from any televisions, the assemblies and methods of the present invention may be used to watch videos that are being televised from one or more aerial vehicles as described herein. The invention provides that a user could store an aerial vehicle (e.g., a personal drone 10) in his/her car, backpack, or even pocket. Upon needing a screen, the drone 10 (and its associated light emitting elements 12, radially extending elements 14, and motor 18) could be activated to produce the desired video (created through POV illusions). In addition, at sporting events, the drones 10 may be programmed and configured to perform flyovers with advertisements showing on the sides of the drones 10 (similar to the current use of blimps with large-screen TV's on their sides). The invention provides that a larger number of drones 10 could be deployed for such applications (compared to standard blimps), making such forms of advertisements much more abundant and affordable (thereby helping sporting venues to generate more advertising revenues).

Still further, as mentioned above, the assemblies of the present invention may be used to produce a camouflaged rendering. In such embodiments, the drones 10 may include light sensors that face and are oriented toward the sky, while the light emitting elements 12, located on radially extending elements 14, may be oriented downwards towards the ground and programmed to produce a graphic display that mimics the light intensity, color, and/or appearance of the sky (as detected by the light sensors) at a defined moment in time (i.e., to "mask" the drones 10 from sight by a casual viewer located on the ground). Such applications provide the benefit of causing confusion among enemy combatants by allowing them to potentially hear a set of drones 10 in their immediate proximity, but not being able to view the drones 10, as well as protecting the drones 10 from countermeasures (such as projectiles or other weaponry). The invention provides that the use of blimps and balloons with the same radially extending LEDs (FIG. 13) may further enable silent operation of such aerial vehicles, to fly longer and to further enhance their use in noise sensitive scenarios.

Other benefits and aspects include the use of helium, hydrogen, or other lighter than air gas filled balloons which can increase the flight time and minimize power consumption to keep the aerial vehicle afloat in air. The air filled balloons or blimps can be added to other ordinary drones and vehicles to make them lighter to achieve longer flight endurance as well. The use of a blimp or balloon can further safeguard, to some extent, against bumping into people or objects or structure and may reduce damage in case of crash or emergency landing. They additionally may be safer to operate around habitable environments with people or sensitive/expensive equipment or objects around.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. An assembly for creating a graphic display, which comprises:
   (a) at least one vehicle that is capable of flight;
   (b) a series of light emitting elements mounted to one or more radially extending elements;
   (c) an axis around which the radially extending elements are configured to rotate, wherein the axis is directly or indirectly connected to the vehicle; and
   (d) a motor that is configured to cause the axis and the radially extending elements to rotate, wherein rotation of the radially extending elements produces a graphic display produced by the light emitting elements, wherein the vehicle is a motorized flying drone, flying balloon, or a flying blimp.

2. The assembly of claim 1, wherein the light emitting elements are light emitting diodes (LEDs) or reflectors.

3. The assembly of claim 2, wherein the assembly includes two or more vehicles that are capable of flight.

4. The method of claim 3, which further comprises activating multiple vehicles that are capable of flight and positioning each of said vehicles in a desired location to form a three-dimensional structure, wherein each of said vehicles generates a graphic display that represents a component of an aggregated graphic display created by the multiple vehicles.

5. The assembly of claim 2, wherein the vehicle includes a power source, which comprises an internal power source, an environmental power source, a power line or tether connected to an external power source, a wireless external power source, or combinations of the foregoing.

6. The assembly of claim 2, wherein the radially extending elements are positioned on a side of the vehicle, a bottom surface of the vehicle, or are positioned and configured to wrap around the vehicle.

7. The assembly of claim 1, wherein the radially extending elements are configured to be retractable and extendable, wherein rotation of the axis and the radially extending elements produces a centrifugal force that causes the radially extending elements to elongate.

8. The assembly of claim 7, which further includes a spring that pulls the radially extending elements into a central hub when the axis and the radially extending elements are not rotating and is configured to control such extension based on a speed of rotation about the axis.

9. The assembly of claim 8, wherein the radially extending elements include a weighting element positioned at or near a distal end of each radially extending element that is configured to (a) increase centrifugal force on the radially extending elements, (b) keep the radially extending elements extended, and (c) increase inertia of the radially extending elements when rotating.

10. A method for creating a graphic display, which comprises activating at least one vehicle that is capable of flight and positioning said vehicle in a desired location, wherein the vehicle comprises (a) a blimp or a balloon and (b) a series of light emitting elements mounted, directly or indirectly, to the at least one vehicle, wherein the series of light emitting elements are positioned and configured to produce a graphic display.

11. The method of claim 10, which further comprises activating multiple vehicles that are capable of flight and positioning each of said vehicles in a desired location to form a three-dimensional structure, wherein each of said vehicles generates a graphic display that represents a component of an aggregated graphic display created by the multiple vehicles.

12. The method of claim 11, which further comprises multiple vehicles that are configured to organize to form patterns, temporary walls, passages, ceilings, statues, or combinations of the foregoing.

13. The method of claim 12, wherein the light emitting elements are configured to change colors.

14. The method of claim 11, wherein the aggregated graphic display is an image, a message, or an advertisement.

15. A method for creating a camouflaged graphic display, which comprises activating at least one vehicle that is capable of flight and positioning said vehicle in a desired location, wherein the vehicle comprises (a) a series of light emitting elements mounted, directly or indirectly, to a first side of the vehicle; and (b) at least one light sensor mounted, directly or indirectly, to a side opposite of the first side of the vehicle that is configured to detect light intensity and an image over a defined area, wherein the series of light emitting elements are configured to produce light and a graphic display that mimics the light intensity and image detected by the at least one light sensor, when the light emitting elements are viewed from a distance, wherein the graphic display is configured to hide objects by positioning camouflaged moving drones around said objects, wherein the graphic display mimics colors that are detected on a first side of the objects.

16. The method of claim 15, which further comprises activating multiple vehicles that are each capable of flight and positioning each of said vehicles in a desired location to form a three-dimensional structure, wherein the multiple vehicles and light emitting elements mounted thereto produce an aggregated graphic display that mimics the light intensity and image detected by the light sensors mounted to each of the multiple vehicles.

17. The method of claim 15, wherein the vehicles are drones, blimps, or balloons.

18. The method of claim 17, wherein the vehicles are configured to arrange or organize together to expand an area of camouflage coverage.

* * * * *